(12) United States Patent
Oberascher et al.

(10) Patent No.: US 8,000,934 B2
(45) Date of Patent: Aug. 16, 2011

(54) METHOD AND DEVICE FOR DIAGNOSING AN ASCERTAINMENT OF A PERFORMANCE QUANTITY OF AN INTERNAL COMBUSTION ENGINE

(75) Inventors: Achim Oberascher, Winterbach (DE); Damien Bouvier, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 12/207,081

(22) Filed: Sep. 9, 2008

(65) Prior Publication Data
US 2009/0157355 A1   Jun. 18, 2009

(30) Foreign Application Priority Data

Sep. 10, 2007   (DE) .................. 10 2007 042 993

(51) Int. Cl.
*F23N 5/00*   (2006.01)
*G06F 19/00*   (2011.01)
*G06F 17/40*   (2006.01)

(52) U.S. Cl. .................... 702/182; 73/114.01; 73/865.8; 431/13; 701/29; 701/99; 701/101; 702/33; 702/187; 702/189

(58) Field of Classification Search .............. 73/112.01, 73/112.03, 114.01, 432.1, 865.8, 865.9; 324/378; 431/13; 701/1, 29, 99, 101; 702/1, 33, 34, 702/127, 182, 183, 184, 185, 187, 188, 189
See application file for complete search history.

(56) References Cited

U.S. PATENT DOCUMENTS 2,883,255 A * 4/1959 Anderson .................. 346/34
3,485,093 A * 12/1969 Muller et al. ............. 73/114.02

* cited by examiner

*Primary Examiner* — Edward R Cosimano
(74) *Attorney, Agent, or Firm* — Kenyon & Kenyon LLP

(57) ABSTRACT

A method and a device for diagnosing an ascertainment of a performance quantity of an internal combustion engine. Within the scope of a first diagnostic process a first value which is characteristic of a first performance quantity of the internal combustion engine ascertained at a first point in time after switching off the internal combustion engine is compared to a predefined value, and an error is identified when in the comparison it is detected that the absolute value of a first difference between the first value and the predefined value exceeds a predefined first threshold value for the first point in time. The predefined first threshold value is predefined to be smaller the longer the time since the internal combustion engine has been switched off. An identified error is cleared in a subsequent second diagnostic process when, for a second difference between the first value and the predefined value for a second point in time, it is detected within the scope of the subsequent second diagnostic process that the absolute value of the second difference does not exceed a second threshold value predefined for the second point in time. An error identified within the scope of the first diagnostic process is cleared within the scope of the subsequent second diagnostic process only when the predefined second threshold value does not exceed a predefined limiting value. The predefined limiting value is formed as a function of the predefined first threshold value.

10 Claims, 2 Drawing Sheets

METHOD AND DEVICE FOR DIAGNOSING AN ASCERTAINMENT OF A PERFORMANCE QUANTITY OF AN INTERNAL COMBUSTION ENGINE

RELATED APPLICATION INFORMATION

The present application claims priority to and the benefit of German patent application no. 10 2007 042993.4, which was filed in Germany on Sep. 10, 2007, the disclosure of which is incorporated herein by reference.

FIELD OF THE INVENTION

The present invention is directed to a method and a device for diagnosing an ascertainment of a performance quantity of an internal combustion engine.

BACKGROUND INFORMATION

There are methods and devices in which, within the scope of a first diagnostic process, a first temperature signal of a first temperature sensor in the internal combustion engine ascertained at a first point in time after switching off the internal combustion engine is compared to a second temperature signal of a second temperature sensor in the internal combustion engine ascertained at the first point in time. An error is identified when in the comparison it is ascertained that the absolute value of the difference between the first temperature signal and the second temperature signal exceeds a predefined first threshold value for the first point in time, the predefined first threshold value being predefined to be smaller the longer the time since the internal combustion engine has been switched off.

An identified error is cleared in a subsequent second diagnostic process; i.e., a corresponding error memory is reset when, within the scope of the subsequent second diagnostic process, for the difference between the first temperature signal and the second temperature signal for a second point in time it is ascertained that the absolute value of the second difference does not exceed a second threshold value predefined for the second point in time.

The problem is the following: the diagnostic accuracy is a function of the time that has elapsed, at the first point in time or at the second point in time, since the internal combustion engine was switched off. The longer the time period since engine switch-off, the smaller the difference between the temperature signals of the two temperature sensors must be in the error-free case. Therefore, the threshold value for comparison with the difference between the two temperature signals is predefined to be smaller the longer the time period since engine switch-off, i.e., the time since the internal combustion engine has been switched off. A minor, incorrect difference between the temperature signals of the two temperature sensors can be identified only if the diagnosis is carried out after an appropriate period of time has elapsed since switching off the engine.

However, if the period of time since switching off the engine is selected to be much shorter for the subsequent second diagnostic process under the same ambient conditions, for example because the internal combustion engine is restarted much earlier after being switched off, the diagnosis is carried out for a much earlier point in time than for the first diagnostic process, so that, as a result of the threshold value for the second diagnostic process which is then larger, the minor, incorrect difference between the two temperature signals is no longer identified as an error; on the contrary, the error previously placed in the error memory in the first diagnostic process is erased, i.e., cleared. However, such an error clearing is not justified.

SUMMARY OF THE INVENTION

In contrast to the related art, the method according to the present invention and the device according to the present invention for diagnosing the ascertainment of a performance quantity of an internal combustion engine having the features of the independent claims has the advantage that an error identified within the scope of the first diagnostic process is cleared within the scope of the subsequent second diagnostic process only when the predefined second threshold value does not exceed a predefined limiting value, and when the predefined limiting value is formed as a function of the predefined first threshold value. In this manner an unwanted error clearing in a subsequent diagnostic process may be prevented.

Advantageous refinements of and improvements on the method stated in the main claim are possible by using the measures described herein.

The characteristic first value ascertained for a first performance quantity of the internal combustion engine may be ascertained in a particularly simple manner by measuring using a first sensor, or from modeling using at least one further performance quantity of the internal combustion engine.

A first temperature of the internal combustion engine may be advantageously selected as the first performance quantity.

In a similarly simple manner the predefined value may be ascertained by measuring using a second sensor, or from modeling using at least one performance quantity of the internal combustion engine.

The predefined value may advantageously be selected which is characteristic of a second performance quantity, which may be a second temperature, of the internal combustion engine. A reliable diagnostic result may thus be achieved by comparing the first value to the predefined value.

A further advantage is realized when the first performance quantity is selected to be equal to the second performance quantity. A diagnostic result based on such a redundant performance quantity ascertainment is particularly reliable.

It is particularly advantageous when a value which is less than or equal to the predefined first threshold value is selected as the predefined limiting value. This ensures that an error may be cleared only when the time period since switching off the engine, on which the subsequent second diagnostic process is based, is at least as long as the time period since switching off the engine, on which the first diagnostic process is based. This ensures that an incorrect difference detected within the scope of the first diagnostic process can at least be recognized in the subsequent second diagnostic process.

A further advantage is realized when the predefined limiting value is selected to be smaller than the predefined first threshold value by an offset value which may be selected as a function of the predefined first threshold value. In this manner the reliability of an error clearing performed on the basis of the subsequent second diagnostic process is increased, since diagnostic tolerances which distort the diagnostic results may also be taken into account.

When the offset value is selected as a function of the predefined first threshold value, allowance is also made for the fact that the diagnostic tolerances are a function of the threshold value used, and thus are a function of the period of time from when the engine is switched off until the diagnosis is carried out.

It is also advantageous when the first point in time and the second point in time are each present in an operating state of the internal combustion engine after the internal combustion engine is switched off, which may be during a subsequent operation of the internal combustion engine, which is characterized by a reduction in the first performance quantity with increasing time. This ensures that for a diagnosis after a fairly long time period since switching off the engine, fairly small, incorrect differences between the first performance quantity and the predefined value may be recognized, and such a recognition is not hindered by an increase in the first performance quantity with increasing time since switching off the engine. In addition, the error clearing, in particular for fairly small, incorrect differences between the first performance quantity and the predefined value, is thus more reliable, since in the case of a reduction in the first performance quantity with increasing time the error clearing is allowed beginning at a point in time associated with the first threshold value, optionally minus the offset value, and thus is generally allowed for a longer time than for the case in which the first performance quantity increases with increasing time, in which the error clearing would be possible only up to a point in time associated with the first threshold value, or optionally minus the offset value.

One exemplary embodiment of the present invention is illustrated in the drawings and explained in greater detail in the description below.

DETAILED DESCRIPTION

Figure 1:
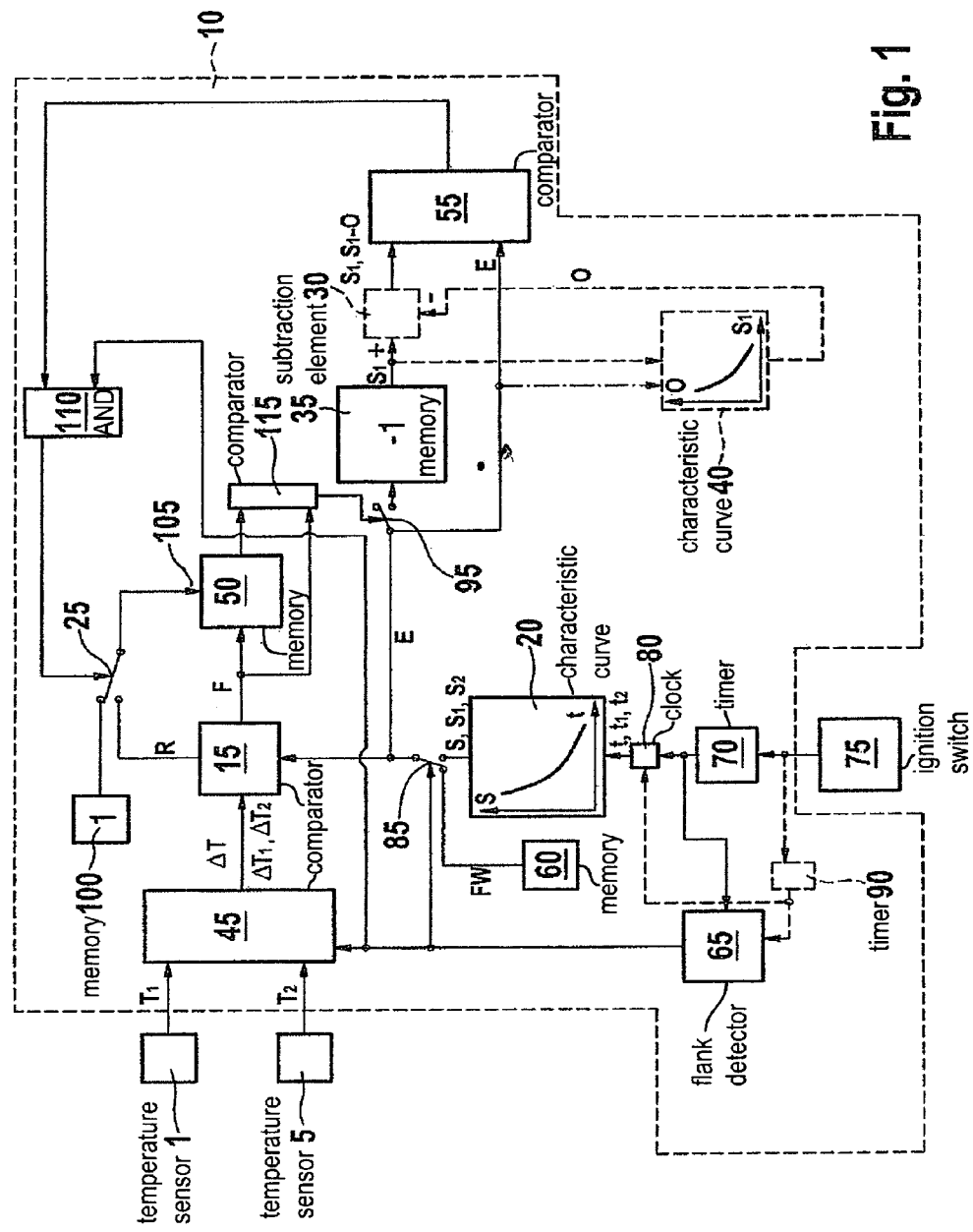
FIG. 1 shows a function diagram for explaining the method according to the present invention and the device according to the present invention.

FIG. 1 illustrates a function diagram for a device 10 according to the present invention for diagnosing the ascertainment of a performance quantity of an internal combustion engine. Device 10 may be implemented, for example, as software and/or hardware in an engine control system for the internal combustion engine. The internal combustion engine itself may be designed as a spark ignition engine or a diesel engine, for example. The sequence of the method according to the present invention is also described with reference to the function diagram according to FIG. 1. Thus, the function diagram according to FIG. 1 at the same time represents a flow chart for the method according to the present invention for diagnosing the ascertainment of a performance quantity of the internal combustion engine.

According to FIG. 1, a first temperature sensor 1 of the internal combustion engine sends a first temperature signal T1 which is constant over time to a first comparator 45 of device 10. First temperature sensor 1 may measure, for example, the oil temperature, cooling water temperature, ambient temperature, intake manifold temperature, or exhaust gas temperature of the internal combustion engine. First temperature signal T1 is thus correspondingly representative of the oil temperature, engine body temperature, ambient temperature, intake manifold temperature, or exhaust gas temperature of the internal combustion engine. The internal combustion engine also has a second temperature sensor 5 which sends a second temperature signal T2 which is constant over time to first comparator 45. One of the previously referenced temperatures of the internal combustion engine, for example, may also be measured using second temperature sensor 5. In that case, second temperature signal T2 is correspondingly representative of the temperature of the internal combustion engine which is measured by second temperature sensor 5. It may be provided that second temperature sensor 5 is designed to be redundant with respect to first temperature sensor 1, so that both temperature sensors 1, 5 measure the same temperature of the internal combustion engine. However, it may also be provided that first temperature sensor 1 and second temperature sensor 5 measure different temperatures of the internal combustion engine.

In first comparator 45, first temperature signal T1 is compared to second temperature signal T2 by forming the difference between the two temperature signals T1, T2. The difference between first temperature signal T1 and second temperature signal T2 is ascertained, for example, by subtraction in first comparator 45. Thus, the first comparator generally provides at its output the absolute value of temperature difference signal $\Delta T = |T1-T2|$ as a signal which is constant over time, and relays this signal to a second comparator 15. Second comparator 15 is also supplied either a fixed value FW from a fixed value memory 60 or a threshold value S from a setpoint selection unit 20 designed as a first characteristic curve, via a first controlled switch 85, depending on the switch position thereof. Fixed value FW may be calibrated on a test bench, for example, in such a way that it is greater than any possible temperature difference according to temperature difference signal $\Delta T$ during operation of the internal combustion engine. Fixed value FW as well as temperature difference signal $\Delta T$ have the units of temperature. Fixed value FW may also be set to a value, without a calibration, which according to experience may never be exceeded by temperature difference signal $\Delta T$ during operation of the internal combustion engine. Thus, a value of 1,000,000° C., for example, may be selected as fixed value FW. Time t is supplied to characteristic curve 20 as an input variable. First characteristic curve 20 maps supplied time t into threshold value S. Threshold value S at time t represents a diagnostic threshold value, the absolute value of which may not be exceeded by a temperature difference signal $\Delta T$ present at a time t when the absence of errors in the performance quantity ascertainment, i.e., in the present example, in the temperature ascertainment using the two temperature sensors 1, 5, is to be detected. The diagnostic accuracy depends on the time elapsed since the internal combustion engine was switched off, the so-called period of time since engine switch-off. The longer the time period since switching off the engine, the smaller the absolute value of temperature difference signal $\Delta T$ must be in order for no errors to be diagnosed.

In other words, the smaller the incorrect difference between the two temperature signals T1, T2, the longer the time the engine must be switched off in order for the difference to be recognizable as an error. Thus, for the situation described, according to first characteristic curve 20 diagnostic threshold value S also becomes progressively smaller with increasing time t, it being possible to ascertain characteristic curve 20 on a test bench or in driving tests, for example. First characteristic curve 20 is calibrated on a test bench, for example, in such a way that for each point in time of decay of the temperature of the internal combustion engine according to temperature signals T1, T2, an incorrect difference in the two temperature signals T1, T2 is recognized in the form of a temperature difference signal $\Delta T$ whose absolute value is greater than diagnostic threshold value S.

In the calibration of diagnostic threshold value S over time t, measuring tolerances of temperature sensors 1, 5 may be taken into account, so that a temperature difference signal $\Delta T$ formed solely on the basis of these measuring tolerances does not result in diagnosis of an error. First characteristic curve 20 may also be calibrated in such a way that it represents the slowest decay of diagnostic threshold value S over time for various ambient conditions, in particular various ambient temperatures.

The described diagnosis using a decreasing diagnostic threshold value S only functions reliably when the ascertained performance quantity, i.e., the ascertained temperature of the internal combustion engine according to temperature signals T1, T2 in the example according to FIG. 1, also decreases with increasing time, which is the case after the internal combustion engine is switched off. However, for the most reliable error diagnosis possible it should be taken into account that, immediately after the internal combustion engine is switched off, the temperature of the internal combustion engine according to temperature signals T1, T2 first rises before it then continuously drops after the subsequent starting or restarting of the internal combustion engine.

Thus, a reliable error diagnosis may be expected only in the operating range of the internal combustion engine in which the temperature of the internal combustion engine according to temperature signals T1, T2 continuously drops over time. Only then is the above-described relationship valid, according to which the difference between the two temperature signals T1, T2 becomes smaller with increasing time since the engine has been switched off. Thus, the time from switching off the engine to carrying out the diagnosis must be selected to be at least long enough so that at the time of the diagnosis the time gradient of first temperature signal T1 and of second temperature signal T2 is negative.

Device 10 also includes a timer 70 which is supplied the signal of an ignition switch 75. When ignition switch 75 is switched on for operating the internal combustion engine, the output signal of the ignition switch is reset. On the other hand, when the internal combustion engine is switched off by ignition switch 75, the output signal of ignition switch 75 is set. The output signal of ignition switch 75 is supplied to timer 70 in the manner described. Timer 70 delays the output signal of ignition switch 75 present at the input thereof by the amount of time represented by the time constant of the timer. The time constant of timer 70 is calibrated on a test bench, for example, in such a way that the time constant is larger than the maximum time which has been detected for an increase in the temperature of the internal combustion engine according to temperature signals T1, T2 after the internal combustion engine is switched off.

The output signal of timer 70 is thus the output signal of ignition switch 75 delayed by the time constant of timer 70. The output signal of timer 70 is supplied to a clock 80 and also to a flank detector 65. Clock 80 is started at the value zero upon receipt of a positive flank at the output of timer 70, and at its output the clock outputs time t elapsed since receipt of the positive flank. This time t is supplied as an input signal to characteristic curve 20. The fact that clock 80 is started with the positive flank at the output of timer 70 ensures that clock 80 does not start to run until a time corresponding to the time constant of timer 70 has elapsed after the internal combustion engine has been switched off by ignition switch 75. This ensures that at the time that clock 80 starts, the temperature increase phase of the internal combustion engine is terminated after the internal combustion engine is switched off and temperature signals T1, T2 have a negative time gradient. By using measured time t of clock 80 supplied to characteristic curve 20, the diagnostic threshold value S supplied at this time t is addressed in each case and is provided at the output of characteristic curve 20. Characteristic curve 20 of diagnostic threshold value S over time t is illustrated as an example in FIG. 2, and beginning at time t=0 has a diagnostic threshold value S which decreases over time t. Flank detector 65 detects the negative flanks in the output signal of timer 70, and thus detects the point in time at which the internal combustion engine is restarted by ignition switch 75, which is delayed by the time constant of timer 70. The temperatures of the internal combustion engine according to temperature signals T1, T2 do not increase immediately when the internal combustion engine is restarted. Rather, after the internal combustion engine is restarted, a certain time elapses until the internal combustion engine heats up again and temperature signals T1, T2 again increase.

In addition to its calibration described above, the time constant of timer 70 should be selected in such a way that it is smaller than the minimum possible time which elapses from restarting of the internal combustion engine by ignition switch 75 until temperature signals T1, T2 once again increase. If it is not possible to apply a time constant which on the one hand is larger than the maximum possible time for the internal combustion engine to heat up after switching off the internal combustion engine, and on the other hand is smaller than the minimum possible time from restarting the internal combustion engine until the internal combustion engine starts to heat up, instead of the output signal of timer 70, flank detector 65 may be supplied the output signal of another timer 90 whose input signal corresponds to the output signal of ignition switch 75 and whose time constant is different from the time constant of timer 70 and is selected in such a way that the time constant is only smaller than the minimum possible time from restarting of the internal combustion engine until the resulting heating has begun, and therefore, until temperature signals T1, T2 have begun to increase. The time constant of timer 70 may then be calibrated solely according to the requirement that it is selected to be larger than the maximum possible time from switching off the internal combustion engine by ignition switch 75 until the end of the heating-up process, and thus, until the end of the increase of temperature signals T1, T2. First controlled switch 85 is activated by the output signal of flank detector 65. First timer 70, as well as the optionally present second timer 90, and the time constants thereof ensure that the diagnosis of the performance quantity ascertainment for the internal combustion engine, in the present example the ascertainment of a temperature of the internal combustion engine, is carried out exclusively in an operating state of the internal combustion engine having a temperature which decreases over time, and therefore having a negative time gradient of temperature signals T1, T2. When second timer 90 is present, its output signal is also supplied as an input signal to clock 80, as illustrated in dashed lines in FIG. 1.

Clock 80 is stopped when a negative flank is received from first timer 70, or alternatively, if second timer 90 is present, when a negative flank is received from second timer 90. The value for time t which is then present at the output of clock 80 is thus "frozen," and is also referred to below as "time period since engine switch-off." If only first timer 70 is used, the measured time period since engine switch-off also corresponds to the actual time period since engine switch-off, i.e., the period of time from when the internal combustion engine is switched off by ignition switch 75 until the internal combustion engine is restarted by ignition switch 75, since the time constant of timer 70 has been applied to the switching-off process as well as to the restarting process for the internal combustion engine. On the other hand, if first timer 70 is used only for starting clock 80 when the internal combustion engine is switched off, and in addition second timer 90, which has a different time constant for stopping clock 80, is used when the internal combustion engine is restarted, the time period since engine switch-off measured by clock 80 is distorted with respect to the actual time period since engine switch-off by the value of the difference between the time constants of first timer 70 and of second timer 90. However, this is not important for carrying out the method according to the present invention as long as it is ensured that for the performed diagnoses either only the first timer 70 is always used, or, according to the alternative embodiment for activating clock 80, first timer 70 is always used for carrying out the diagnoses and second timer 90 is always used for stopping clock 80.

When the negative flank of first timer 70 is received, or alternatively, when second timer 90 is present, when the negative flank of the second timer is received, flank detector 65 causes first controlled switch 85 to connect the output of characteristic curve 20 to second comparator 15.

The output signal of first timer 70 is also supplied to flank detector 65 when second timer 90 is present. However, when second timer 90 is present, the output signal of first timer 70 is evaluated by flank detector 65 only with respect to detection of a positive flank, whereas the output signal of second timer 90 is evaluated by flank detector 65 only with respect to presence of a negative flank. If only first timer 70 is present, flank detector 65 evaluates the output signal of first timer 70 with respect to both the positive flank and the negative flank of the first timer.

First controlled switch 85 is then activated by flank detector 65 to connect the output of characteristic curve 20 to second comparator 15 until flank detector 65 once again detects a positive flank at the output of first timer 70. First controlled switch 65 is then activated in such a way that it once again supplies fixed value FW of fixed value memory 60 to second comparator 15.

Since output signal S of characteristic curve 20 is no longer changed upon detection of the negative flank by flank detector 65 and the simultaneous stopping of clock 80, second comparator 15 is supplied a fixed value, which is constant over time, by characteristic curve 20 via first controlled switch 65. Two successive diagnostic processes are considered below. The fixed value which is supplied by characteristic curve 20 during the first-diagnostic process is designated by reference numeral S1, and the fixed value which is supplied by characteristic curve 20 during the subsequent diagnostic process is designated by reference numeral S2. In FIG. 1 the output signal of first controlled switch 85 is generally designated by reference character E, output signal E corresponding to either fixed value FW or to a fixed value supplied by characteristic curve 20, depending on the switch position of first controlled switch 85, i.e., for the first diagnostic process, corresponding to fixed value S1 and for the next following diagnostic process, corresponding to fixed value S2.

Output signal E of first controlled switch 85 may be supplied to a threshold value memory 35 via a second controlled switch 95, and is also directly supplied to a third comparator 55. Second comparator 15 checks whether temperature difference signal $\Delta T$ exceeds output signal E of first controlled switch 85. If this is the case, an error signal F is set at a first output of second comparator 15, and a reset signal R is reset at a second output of second comparator 15. On the other hand, if temperature difference signal $\Delta T$ does not exceed output signal E, error signal F is reset at the first output of second comparator 15, and the reset signal is set at the second output of second comparator 15. Error signal F is supplied to an error memory 50. An error code is stored in error memory 50 when error memory 50 receives a set error signal F. Such an error code may be used, in a manner not illustrated in FIG. 1, for optical and/or acoustic transmission of an error message. When an error code is stored in error memory 50, error memory 50 causes second controlled switch 95 to close, thereby supplying output signal E of first controlled switch 85 to threshold value memory 35. In this manner threshold value memory 35 is overwritten by output signal E.

Error memory 50 also has a reset input, via which reset signal R may be supplied via a third controlled switch 25. Alternatively, the reset input of error memory 50, designated by reference numeral 105 in FIG. 1, is supplied with a setting value of a setting value memory 100 via third controlled switch 25. If the setting value of setting value memory 100 is supplied to reset input 105 of error memory 50, it is not possible to reset error memory 50, and an error code stored in the error memory remains stored unchanged in error memory 50. Only when reset input 105 of error memory 50 is supplied with a set reset signal R from the second output of second comparator 15 via third controlled switch 25 is an error code which is stored in error memory 50 overwritten with a neutral value, for example the value zero, which is different from the error code and which indicates the absence of errors. In this case no error message is transmitted and second controlled switch 95 is opened, so that output signal E is no longer able to overwrite threshold value memory 35, and the last value stored in threshold value memory 35 remains unchanged. According to a first specific alternative embodiment, the threshold value stored in threshold value memory 35 is likewise supplied to third comparator 55, where it is compared to output signal E.

However, if reset signal R is reset at the second output of second comparator 15, it is thus not possible for an error code in error memory 50 to be overwritten.

Third comparator 55 checks whether output signal E of first controlled switch 85 exceeds the output signal of threshold value memory 35. If this is not the case, third comparator 55 causes third controlled switch 25 to connect the second output of second comparator 15 to reset input 105 of error memory 50 via an AND element 110, the function of which is explained further below, thereby supplying reset signal R to reset input 105 of error memory 50. If reset signal R is set, an error code stored in error memory 50 is overwritten by the neutral value; otherwise, the error code remains in error memory 50 unchanged, as described above. However, if third comparator 55 determines that output signal E of first controlled switch 85 has overwritten the output signal of threshold value memory 35, third comparator 55 causes third controlled switch 25 to connect setting value memory 100 to reset input 105 of error memory 50, so that an error code stored in error memory 50 may not be removed, and instead remains.

On account of the described selection of fixed value FW, only for the case in which diagnostic threshold value S is supplied as a fixed value to second comparator 15 via first controlled switch 85 is it possible for this diagnostic threshold value S to be exceeded by the absolute value of temperature difference signal $\Delta T$, and thus, for error signal F to be set. Only in this case it is possible for an error code to be stored in error memory 50, and for second controlled switch 95 to be closed in order to connect the output of first controlled switch 85 to threshold value memory 35. The mode of functioning of the described function diagram according to FIG. 1 is described below with reference to a specific example, also with reference to FIG. 2.

Figure 2:
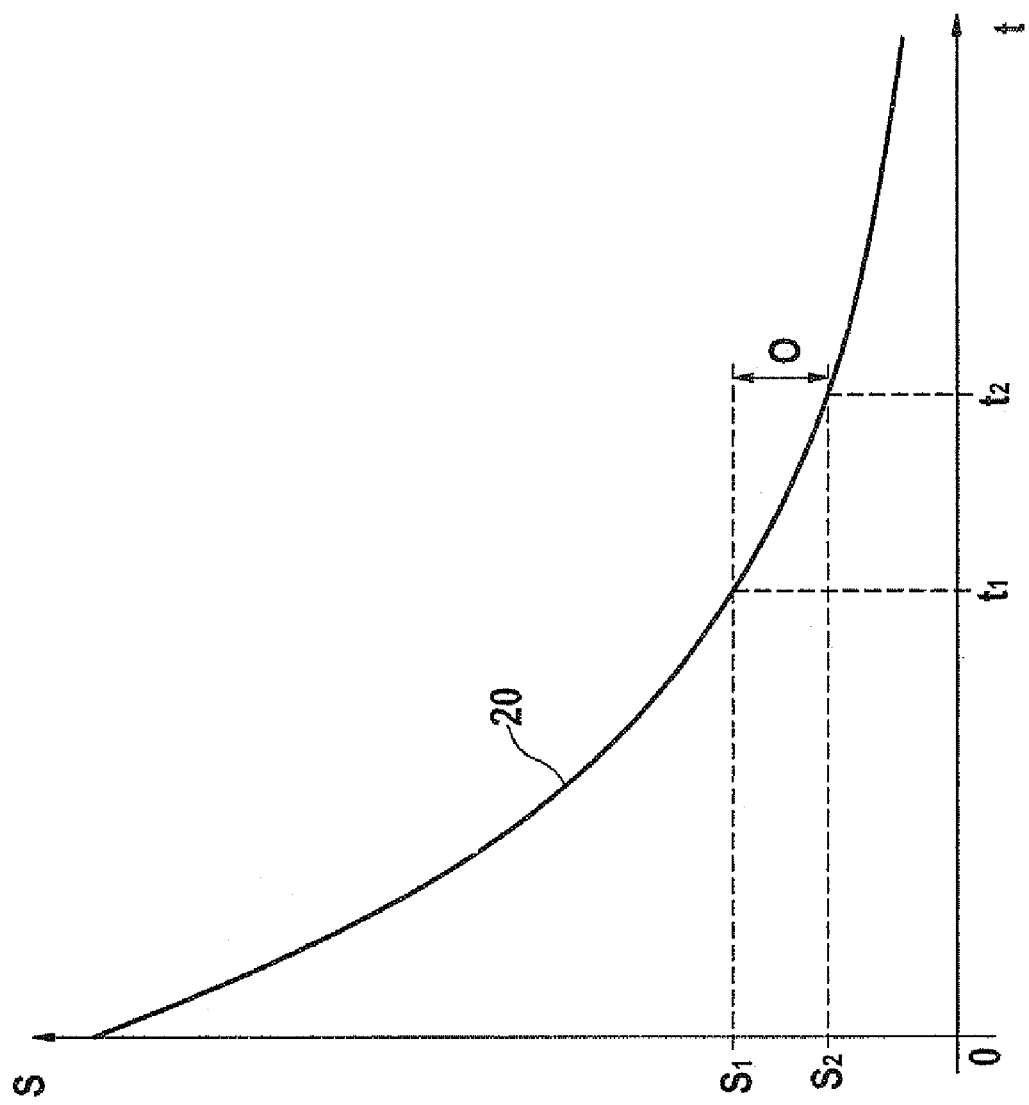
FIG. 2 shows a diagram of a threshold value over time for illustration of the enable condition for the error clearing.

It is assumed that in a first diagnostic process a first time period since engine switch-off $t_1$ is ascertained, using clock 80 in the described manner, which according to characteristic curve 20 in FIG. 2 results in outputting of first threshold value S1 as a fixed value. This first threshold value S1 is supplied to second comparator 15. It is assumed only as an example that the absolute value of temperature difference signal ΔT of temperature signals T1, T2 present at first time $t_1$ exceeds first threshold value S1, as the result of which error signal F is set, the error code is stored in error memory 50, and second controlled switch 95 is closed. In this manner first threshold value S1 enters threshold value memory 35, and from the output thereof enters third comparator 55. At the same time, first threshold value S1 is also present at the other input of comparator 55. Third comparator 55 thus determines that output signal E of first controlled switch 85, which is equal to first threshold value S1, does not exceed the output signal of threshold value memory 35, which likewise corresponds to first threshold value S1, so that third controlled switch 25 is caused to connect the second output of second comparator 15 to reset input 105 of error memory 50.

Because the absolute value of temperature difference signal ΔT exceeds first threshold value S1, reset signal R is reset, and the error code therefore remains stored in error memory 50.

First controlled switch 85 is not reactivated by flank detector 65 for connecting fixed value memory 60 to second comparator 15 until the next time the internal combustion engine is switched off by ignition switch 75, so that error signal F is reset and reset signal R is set only after the next time the internal combustion engine is switched off.

The output signal of flank detector 65 is reset when flank detector 65 detects a positive flank at the output of first timer 70, and is set when flank detector 65 detects a negative flank at the output of first timer 70, or alternatively, if second timer 90 is present, at the output of second timer 90. The output signal of flank detector 65 is supplied to AND element 110. The output signal of third comparator 55 is also supplied to AND element 110. The output signal of third comparator 55 is set when output signal E of first controlled switch 85 does not exceed the output signal of threshold value memory 35; otherwise, the output signal is reset. Thus, the output signal of AND element 110 is set only when both of its input signals are set. The output signal of AND element 110 is then used to activate third controlled switch 25. Third controlled switch 25 is activated to connect threshold value memory 100 to reset input 105 of error memory 50 for as long as the output signal of AND element 110 is reset; otherwise, the third controlled switch is activated to connect the second output of second comparator 15 to reset input 105 of error memory 50.

This means that resetting of error memory 50 and overwriting of an error code stored therein by the neutral value are possible only from the time after the internal combustion engine is restarted, as detected by flank detector 65, until the next time the internal combustion engine is switched off, as detected by flank detector 65, i.e., are not possible during the connection of fixed value memory 60 to second comparator 15 via first controlled switch 85.

However, the output signal of flank detector 65 is reset for as long as fixed value memory 60 is connected to second comparator 15 via first controlled switch 85, so that third controlled switch 25 is activated for connecting setting value memory 100 to reset input 105 of error memory 50. Thus, it is not possible for error memory 50 to be reset when fixed value memory 60 is connected to second comparator 15 via first controlled switch 85; i.e., the error code stored during the first diagnostic process may not be overwritten by the neutral value, and instead remains in error memory 50. It is assumed that a second time period since engine switch-off $t_2$, from the next time the internal combustion engine is switched off until the next time the internal combustion engine is restarted, has been ascertained by clock 80 to be greater than the first time period since engine switch-off $t_1$. This results in the outputting of a second threshold value S2 which is smaller than first threshold value S1, according to characteristic curve 20.

The output signal of flank detector 65 is also supplied to first comparator 45. First comparator 45 forms temperature difference signal ΔT from temperature signals T1, T2 in the described manner at the point in time when the output signal of flank detector 65 has a positive flank, i.e., at the time when the output signal changes from the reset state to the set state, and therefore, the time at which clock 80 is stopped. For detection of this positive flank, comparator 45 may also have a flank detector in a manner which is not illustrated. Thus, the synchronicity between temperature difference signal ΔT and ascertained diagnostic threshold value S is ensured; i.e., diagnostic threshold value S which is supplied to second comparator 15 via first controlled switch 85 is associated with the same point in time as temperature difference signal ΔT at the output of first comparator 45. Diagnostic threshold value S which is supplied to second comparator 15 via first controlled switch 85 is thus associated with the time period since engine switch-off ascertained by clock 80, at which comparator 45 ascertains temperature difference signal ΔT.

The temperature difference signal ascertained by second comparator 45 at first time period since engine switch-off $t_1$ within the scope of the first diagnostic process represents a first temperature difference signal $\Delta T_1$. This value is compared to first threshold value S1. If the absolute value of first temperature difference signal $\Delta T_1$ is greater than first threshold value S1, error signal F is set and reset signal R is reset; otherwise, error signal F is reset and reset signal R is set. Temperature difference signal ΔT, ascertained at the second time period since engine switch-off $t_2$ within the scope of the next second diagnostic process, is a second temperature difference signal ΔT2, and is compared to second threshold value S2 by second comparator 15. It is assumed only as an example that the absolute value of second temperature difference signal ΔT2 does not exceed second threshold value S2. Therefore, error signal F is reset and reset signal R is set. However, because of reset signal R being set, it is not possible for the error code in error memory 50 to be overwritten by the neutral value when third controlled switch 25 connects the second output of second comparator 15 to reset input 105 of error memory 50.

Second controlled switch 95 is activated by a fourth comparator 115. Fourth comparator 115 is supplied with the output signal of error memory 50 as well as error signal F of second comparator 15. Comparator 115 activates second controlled switch 95 for connecting output signal E of first controlled switch 85 to threshold value memory 35 when error signal F is set and the error code is stored in error memory 50. In all other cases, fourth comparator 115 activates second controlled switch 95 in such a way that output signal E of first controlled switch 85 is not able to enter threshold value memory 35. Thus, on the one hand threshold value memory 35 may be overwritten only when an error state is detected in which the absolute value of temperature difference signal ΔT exceeds diagnostic threshold value S which is supplied to second comparator 15 via first controlled switch 85, error signal F is set, and consequently an error code is stored in error memory 50. On the other hand, if an error code is stored in error memory 50 but error signal F is reset, second controlled switch 95 is opened and it is not possible for threshold value memory 35 to be overwritten by output signal E.

During the first diagnostic process, error signal F is set and an error code is stored in error memory 50, as the result of which second controlled switch 95 is closed and first threshold value S1 may be stored in threshold value memory 35. During the next second diagnostic process only error signal F is reset, but the error code is still stored in error memory 50. Second controlled switch 95 is thus opened, as the result of which second threshold value S2 is not able to reach threshold value memory 35. Third comparator 55 thus compares first threshold value S1 at the output of threshold value memory 35 to second threshold value S2 at the output of first controlled switch 85. Since second threshold value S2 is smaller than first threshold value S1, third comparator 55 outputs a setting signal at its output.

Since the output signal of flank detector 65 is also set upon activation of first controlled switch 85 for connecting the output of characteristic curve 20 to second comparator 15, a set output signal results at the output of AND element 110, thereby activating third controlled switch 25 in such a way that the second output of second comparator 15 is connected to reset input 105 of error memory 50, and the error code in error memory 50 is therefore replaced by the neutral value due to reset signal R being set. In this manner the error diagnosed during the first diagnostic process is cleared during the second diagnostic process, and transmission of the error message is terminated.

According to one specific alternative embodiment, a second characteristic curve 40 is provided whose input signal is the output signal of threshold value memory 35, and whose output signal is an offset value O. A subtraction element 30 is also provided, in which offset value O at the output of second characteristic curve 40 is subtracted from the output of threshold value memory 35. The resulting difference, instead of the output of threshold value memory 35, is then supplied to comparator 55. In this manner comparator 55 checks whether output signal E of first controlled switch 85 exceeds the output of threshold value memory 35 minus offset value O, and if this is not the case outputs a setting signal; otherwise, the comparator outputs a reset signal at its output. By using offset value O, in particular measuring tolerances of temperature sensors 1, 5 are taken into account, but in addition the region around first threshold value S1 is established in which an error clearing is allowed.

Since first threshold value S1 of the first diagnostic process, within the scope of which an error has been identified, determines in the described manner the request for second threshold value S2 of the next or a subsequent diagnostic process in order to correct errors identified during the first diagnostic process, offset O is therefore also a function of this first threshold value S1. Offset O may be selected to be larger as first threshold value S1 increases, as indicated in FIG. 1. Conversely, the allowable tolerances and thus offset value O become smaller as first threshold value S1 decreases.

Characteristic curve 40 may be calibrated on a test bench, for example, to ensure for various possible first threshold values S1, using the particular associated offset value O, that no undesired error clearing is allowed as the result of the referenced measuring tolerances. In the calibration of second characteristic curve 40, care may also be taken that second threshold value S2 allowed for an error clearing is smaller, always in the same proportion to the greatest extent possible, than first threshold value S1 for the diagnostic process in which the error to be cleared has been detected. Thus, for this reason as well, offset value O should likewise decrease as first threshold value S1 decreases.

According to one specific alternative embodiment it may also be provided to allow an error clearing when output signal E or second threshold value S2 is greater than first threshold value S1. In this case, instead of characteristic curve 40 a characteristics map is provided which is supplied with first threshold value S1 as well as signal E. This is indicated in dashed lines in FIG. 1, in the present case reference numeral 40 representing the corresponding characteristics map. For $E<S1$, the response of offset value O at the output of characteristics map 40 is the same as the output of characteristic curve 40 in the previously described exemplary embodiment as a function solely of first threshold value S1. For $E>S1$, however, offset value O is negative at the output of characteristics map 40, and its absolute value increases up to a maximum value which, for example, is calibrated on a test bench in such a way that an error clearing is possible only up to a second threshold value S2 which is not significantly above first threshold value S1, for example is not greater by more than 10%. For $E=S1$, in this specific alternative embodiment offset value O is equal to zero at the output of characteristics map 40.

Thus, for the specific embodiments having offset value O, in third comparator 55 second threshold value S2 is compared not to first threshold value S1, but, rather, to the difference S1−O. An error clearing is possible only when S2 is less than or equal to S1−O. This is also illustrated in FIG. 2. In FIG. 2, value O is plotted as the difference between first threshold value S1 and second threshold value S2. This means that for all points in time t equal to or greater than $t_2$ the error clearing is allowed, but for all points in time t less than $t_2$ no error clearing is allowed, because second threshold value S2 may be less than or equal to S1−O only for points in time t which are equal to or greater than $t_2$.

Alternatively, for a simpler implementation which, however, does not take the above discussion into account, offset value O may also be calibrated as a fixed value regardless of the output of threshold value memory 35. The calibration as a fixed value may be carried out on a test bench, for example, in such a way that the measured measuring tolerances for a first time period since engine switch-off $t_1$ for a first diagnostic process in which an error is diagnosed are generally sufficiently taken into account for an error clearing in a subsequent second diagnostic process.

The temperatures measured by temperature sensors 1, 5 may be, for example, the oil temperature, cooling water temperature, ambient temperature, intake manifold temperature, or the exhaust gas temperature of the internal combustion engine, it being possible, as described, for two temperature sensors 1, 5 in each case to measure referenced temperatures which are the same or different. For the case of ambient temperature, this temperature may be used only for comparing to a temperature which is different from ambient temperature, since it is independent from switching off the internal combustion engine. Alternatively, it may be provided that one or both of temperature signals T1, T2 are modeled using other performance quantities of the internal combustion engine in a manner known to those skilled in the art. Since this modeling takes place at the time of the time period since engine switch-off $t_1$, $t_2$ and thus after the internal combustion engine is restarted, the performance quantities necessary for the modeling are also available. These other performance quantities may be parameters such as fresh air mass flow, intake manifold pressure, etc. For the case that first temperature signal T1 and second temperature signal T2 each represent the same temperature of the internal combustion engine because, for example, both signals represent the intake manifold temperature, when both temperature signals T1, T2 are modeled each of the temperature signals must be modeled using different performance quantities, since otherwise, it is not possible to obtain a temperature difference signal ΔT which is different from zero.

The method according to the present invention and the device according to the present invention allow the ascertainment of temperature signals T1, T2 to be diagnosed. Set error signal F indicates an error in first temperature sensor 1 or second temperature sensor 5. If at least one of temperature signals T1, T2 is ascertained by modeling using at least one performance quantity of the internal combustion engine which is different from first temperature signal T1 or from second temperature signal T2, error signal F may also be set when the modeling is incorrect, i.e., on the basis of a defective sensor system for measuring the at least one performance quantity required for the modeling.

The above-described method and the above-described device have been described for the example of ascertaining temperature signals T1, T2. The ascertainment of performance quantities which are different from a temperature of the internal combustion engine may also be diagnosed in a corresponding manner. The diagnosis according to the present invention may be used for all performance quantities of the internal combustion engine which, similarly as for the temperature, decay after the internal combustion engine is switched off. This may apply, for example, to an intake manifold pressure, an exhaust gas pressure, or a boost pressure of the internal combustion engine, whose ascertainment may thus be diagnosed according to the above-described method and the above-described device.

The first diagnostic process does not have to be the first diagnostic process since an original start of the internal combustion engine, but, rather, with respect to the second diagnostic process characterizes a diagnostic process in which an error has been identified. The second diagnostic process may then be the next, or any given subsequent diagnostic process within the scope of which the error identified in the first diagnostic process may be cleared only under the condition that second threshold value S2 is less than or equal to a limiting value which is formed as a function of first threshold value S1, the description herein discussing two examples for forming this limiting value, namely, formation of the limiting value which is equal to first threshold value S1, and formation of the limiting value which is equal to first threshold value S1 minus offset value O.

What is claimed is:

1. A method for diagnosing an ascertainment of a performance quantity of an internal combustion engine, the method comprising:
    ascertaining, within the scope of a first diagnostic process, a first value, which is characteristic of a first performance quantity of the internal combustion engine, at a first point in time after switching off the internal combustion engine;
    comparing the first value to a predefined value;
    identifying an error when in the comparison it is detected that an absolute value of a first difference between the first value and the predefined value exceeds a predefined first threshold value for the first point in time, the predefined first threshold value being predefined to be smaller the longer the time since the internal combustion engine has been switched off; and
    clearing an identified error in a subsequent second diagnostic process when, for a second difference between the first value and the predefined value for a second point in time, it is detected within the scope of the subsequent second diagnostic process that the absolute value of the second difference does not exceed a second threshold value predefined for the second point in time;
    wherein the error identified within the scope of the first diagnostic process is cleared within the scope of the subsequent second diagnostic process only when the predefined second threshold value does not exceed a predefined limiting value, and the predefined limiting value is formed as a function of the predefined first threshold value.

2. The method of claim 1, wherein the first value is ascertained by one of (i) measuring using a first sensor, and (ii) a model based on at least one further performance quantity of the internal combustion engine.

3. The method of claim 1, wherein the first point in time and the second point in time respectively occur in an operating state of the internal combustion engine after the internal combustion engine is switched off, which is during a subsequent operation of the internal combustion engine, which is characterized by a reduction in the first performance quantity with increasing time.

4. The method of claim 2, wherein the predefined value is ascertained by one of (i) measuring using a second sensor, and (ii) a model based on at least one performance quantity of the internal combustion engine.

5. The method of claim 1, wherein a first temperature of the internal combustion engine is selected as the first performance quantity.

6. The method of claim 1, wherein the predefined value is characteristic of a second performance quantity, which is a second temperature, of the internal combustion engine.

7. The method of claim 6, wherein the first performance quantity is selected to be equal to the second performance quantity.

8. The method of claim 1, wherein a value which is less than or equal to the predefined first threshold value is selected as the predefined limiting value.

9. The method of claim 8, wherein the predefined limiting value is selected to be smaller than the predefined first threshold value by an offset value which is selected as a function of the predefined first threshold value.

10. A device for diagnosing an ascertainment of a performance quantity of an internal combustion engine, comprising:
    a comparing arrangement, which within the scope of a first diagnostic process, is used to compare a first value which is characteristic of a first performance quantity of the internal combustion engine at a first point in time after switching off the internal combustion engine to a predefined value;
    an error identification arrangement to identify an error when in the comparison it is detected that the absolute value of a first difference between the first value and the predefined value exceeds a predefined first threshold value for the first point in time;
    a specifying arrangement to specify the predefined first threshold value to be smaller the longer the time since the internal combustion engine has been switched off; and
    an error clearing arrangement to clear an identified error in a subsequent second diagnostic process when for a second difference between the first value and the predefined value for a second point in time it is detected within the scope of the subsequent second diagnostic process that the absolute value of the second difference does not exceed a second threshold value predefined for the second point in time, wherein the error clearing arrangement is configured so that within the scope of the subsequent second diagnostic process, the error identified within the scope of the first diagnostic process is cleared only when the predefined second threshold value does not exceed a predefined limiting value;
    a forming arrangement to form the predefined limiting value as a function of the predefined first threshold value.

* * * * *